US006383658B1

(12) United States Patent
Carlson et al.

(10) Patent No.: US 6,383,658 B1
(45) Date of Patent: May 7, 2002

(54) THERMALLY SPRAYED COATINGS HAVING AN INTERFACE WITH CONTROLLED CLEANLINESS

(75) Inventors: Douglas M. Carlson, Cedar Crest, NM (US); Charles A. Claus, Concord, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/443,117

(22) Filed: Nov. 18, 1999

(51) Int. Cl.[7] ................................................ B32B 15/00

(52) U.S. Cl. ...................... 428/615; 428/612; 428/668; 428/678; 428/679; 428/680; 416/241 R

(58) Field of Search ................................ 428/612, 613, 428/614, 615, 668, 678, 679, 680, 469; 415/179; 416/241 R

(56) References Cited

U.S. PATENT DOCUMENTS 5,538,796 A * 7/1996 Schaffer et al. ............. 428/469
5,834,070 A * 11/1998 Movchan et al. ........... 427/566
5,840,434 A * 11/1998 Kojima et al. .............. 428/632

* cited by examiner

*Primary Examiner*—Deborah Jones
*Assistant Examiner*—Jennifer McNeil
(74) *Attorney, Agent, or Firm*—David L. Narciso; Carmen Santa Maria

(57) ABSTRACT

An article having a layer of metal thermally sprayed over a substrate with a roughened interface at the surface of the substrate applied by a thermal spray process, such as the HVOF process. The interface has a predetermined cleanliness level so that after a diffusion heat treatment, the applied layer has an extended life in severe gas turbine service due to improved adhesion of the layer to the substrate. When the article is used for high temperature applications such as turbine shrouds and encounters significant levels of stress, the strength of the interface can be a factor in the life of the coating.

10 Claims, No Drawings

THERMALLY SPRAYED COATINGS HAVING AN INTERFACE WITH CONTROLLED CLEANLINESS

The invention herein described was made in the course of or under a contract or subcontract thereunder (or grant) with the Department of the Navy.

BACKGROUND OF THE INVENTION

1. Field of the Invention

This invention relates generally to thermal spraying of powdered materials using high velocity oxy-fuel processes and specifically to a process or article applying a layer of metallic material over a superalloy shroud substrate in order to achieve an improved life expectancy.

2. Discussion of the Prior Art

High velocity oxy-fuel ("HVOF") is a well-known commercial process used for application of a metal as a coating. Metal powder, typically an alloy powder, is applied by melting the powder at flame temperatures that are well below the temperatures required to melt ceramics. The melted powder is directed at a substrate and has high particle velocities. The HVOF process produces a densely deposited coating.

One of the applications for the HVOF process is for deposition of a metallic layer over the substrate of an article that is used in operating environments that are thermally and chemically hostile, such as the environment within a gas turbine engine. Such a layer is formed from high temperature, oxidation-resistant alloys including nickel-based superalloys, cobalt-based superalloys and MCrAlY alloys in which M can be iron, cobalt, nickel and combinations thereof.

When MCrAlY alloys are deposited as metallic layers for turbine section components of gas turbine engines, the HVOF process is preferred because it can provide a suitable coating at less expense. However, in order to apply a metallic layer to a substrate using the HVOF process that will properly adhere at elevated temperatures and under high stresses, it is necessary to properly prepare the substrate prior to metal application. Substrates that will utilize a metallic layer applied by the HVOF process generally are roughened to a surface finish of about 125 RMS or rougher. The roughened surface finish is required to improve the adhesion of the layer applied by the HVOF process. It is believed that the rough surface finish is initially required to provide a mechanical adhesion component to the attachment of the metallic layer to the substrate. The lower temperature of application of a layer using thermal spray processes such as HVOF creates a weak metallurgical bond, and the additional strength required for the bonding of the layer to the substrate may not be fully developed initially because of the lower application temperatures. This is a distinction from other processes such as plasma spray processes in which a stronger metallurgical bond is developed between the substrate and the applied coat. Metallic layers applied by the HVOF process are frequently used on shrouds used for turbine applications. The preparation of a substrate for application of the metallic layer by the HVOF process generally is accomplished by grit blasting. The shrouds to which the metallic layers have been applied are then heat treated to promote diffusion. The heat treatment further develops the metallurgical bond of the HVOF-applied metallic layer to the substrate. Thus, the final superior adhesion of the layer of the coating is a result of both mechanical and metallurgical bonding. However, it has been found that grit blasting can embed blasting media in the surface of the substrate. Furthermore, the embedded media can adversely affect the adhesion of the coating to the substrate. Too large a concentration of grit at the interface between the HVOF-applied layer and the substrate can impede the diffusion and act as stress risers that may contribute to delamination of the applied layer as the coating is cycled in service.

What is needed is a substrate article that has a roughened surface, the surface roughness being greater than about 80 RMS, but that does not include embedded grit or dirt from a roughening operation that may adversely affect the adhesion of an HVOF-applied coating to the substrate. Alternatively, if a substrate article does include embedded grit or dirt from a roughening operation, the amount of grit or dirt is controlled in a manner so as not to affect the adhesion of an HVOF-applied layer to the substrate. When an article is roughened by grit blasting, what is needed is a method to effectively control the amount of embedded grit or dirt to assure that it is maintained below a critical level in order to assure effective adhesion of the HVOF-applied layer to the substrate upon application.

BRIEF SUMMARY OF THE INVENTION

According to the present invention, there is provided an article having a layer of metal applied by a thermal spray process, such as the HVOF process, over a substrate with a roughened interface at the surface of the substrate, the interface having a predetermined cleanliness level so that after a diffusion heat treatment, the applied layer has an extended life in severe gas turbine service due to improved adhesion of the layer to the substrate. When the article is used for high temperature applications and encounters significant levels of stress, the strength of the interface can be a factor in preventing coating delamination that affects the life of the article.

The article of the present invention includes a substrate and a layer of an MCrAlY that is applied by the HVOF process over the substrate. In accordance with the present invention, the substrate is roughened to achieve a surface finish of at least 80 RMS before application of the bond coat so that the interface therebetween is also at least 80 RMS. The surface preparation is controlled such that a cleanliness of less than 25% oxide contamination is present between the roughened substrate surface and the HVOF-applied metal. The article is thus comprised of a substrate with a layer of MCrAlY overlying the substrate, the interface between the substrate and the layer having a surface roughness of at least about 80 RMS and oxide contamination of less than about 25%.

The present invention can be achieved by roughening the substrate by any convenient method that achieves a surface roughness of at least 80 RMS before applying an MCrAlY coating using the HVOF process. This may include any suitable chemical, metallurgical or mechanical method that will produce an article that has such a surface roughness. Whatever method is used to roughen the surface of the substrate, it must be controlled by appropriate methods so that the amount of foreign residual material that remains on the surface that can affect the adhesion of the layer to the substrate remains below a predetermined level. This assures that the interface between the substrate and the applied layer is sufficiently clean so that premature failures due to delamination do not occur.

An advantage to the present invention is that metallic layers applied by the HVOF process to a suitably cleaned substrate will have a both a longer life and less susceptibility to delaminating than will layers applied by the HYOF process to substrates not suitably controlled in accordance with the present invention.

Another advantage of the present invention is that well known methods for roughening a substrate can be used to achieve the required mechanical bond between a layer applied by the HVOF process and the substrate provided that appropriate processing to clean the substrate of undesirable and excess contamination, particularly in the form of oxides is undertaken.

Yet another advantage of the present invention is that inspection techniques can determine whether sufficient cleanliness of the interface between an HVOF-applied layer and a substrate has been achieved, so that the likelihood of articles not having the required cleanliness being placed into service is significantly reduced or eliminated.

Another advantage of the present invention is that the use of a predetermined, quantifiable limit on cleanliness permits the use of statistical methods to control processing. Thus, a sampling plan for part inspection can be used to verify that the predetermined limits are not exceeded for parts placed into service. This ability to craft a sampling plan to determine the acceptability of a production lot of parts is important since interface cleanliness can only be determined by destructive examination, making 100% inspection an impossibility.

The present invention permits the use of cost effective HVOF metal application procedures and cost effective methods for cleaning the substrate prior to applying metal to the substrate in conjunction with statistically-based inspection procedures. These methods and procedures provide an article with assurance of an improved life expectancy in hostile environments in which operations occur at high temperatures, generally sustained temperatures above about 1800° F. and, in certain circumstances, critical stresses above an endurance limit for the temperature of operation. Furthermore, the present invention permits the use of statistical analytical techniques to predict production lots of articles that are not sufficiently clean, and are likely not to achieve full life expectancy.

Other features and advantages of the present invention will be apparent from the following more detailed description of the preferred embodiments.

DETAILED DESCRIPTION OF THE INVENTION

The present invention, while generally applicable to article substrates to which a metal layer can be applied using the HVOF process, is specifically directed to shrouds and shroud assemblies positioned within the turbine portion of a gas turbine engine to which a layer of MCrAlY metal is applied in thicknesses of about 0.03 inches or greater prior to being placed into service. Other turbine components that operate in the hot portion of a gas turbine engine, referred to as the turbine section, which are subjected to the high temperatures and the hot oxidative and corrosive gases to which this invention may be applicable include turbine blades, stators and vanes.

The substrates of these components are typically made from superalloy materials such as Rene N5 and other well-know nickel base alloys such as IN-738 or cobalt base alloys such as MAR-M-509 that have been formulated for use in such hostile chemical and high temperature environments. Despite the improved properties of these materials, they still require additional environmental protection to survive such harsh operating conditions. This additional environmental protection typically is provided by at least one layer, such as aluminides and MCrAlY alloys, applied over the substrate along flow path surfaces. MCrAlY flow path layers for shrouds and shroud assemblies serve an additional function. These layers also act as clearance control surfaces for rotating turbine blades. The shrouds and shroud assemblies form an outer boundary through which the hot gases of combustion flow. The turbine blades rotate within this boundary, being rotated by the motion of the hot gases. In order to achieve maximum efficiency of operation, the gap between the rotating blades and the shrouds or shroud assemblies is kept as small as possible to minimize the leakage of gases around the blade tips. This can be achieved by providing a shroud outer layer that is a softer material than the corresponding blade tip so that the blade tips wear into the outer layer of the shroud while causing a minimum of wear on the blade tips. This shroud outer layer is HVOF-applied MCrAlY that is applied in ample thickness so as to be present after the initial rub-in by the rotating blades and has sufficient additional thickness to survive an unusual rub excursion by the blades without adversely affecting the environmental protection provided by the layer.

Because of the importance of the layer in providing environmental protection to the substrate and in providing an effective clearance control surface along the shroud flow path surface, application of the layer over the substrate has become critical. Of course, due to the great expense of applying protective layers over substrates by various processes, improvements, including methods of reducing costs of applying layers that do not adversely affect the performance of the components are on-going. One of the cost-effective improvements has included the application of MCrAlY alloys as a layer using the HVOF process to substrates. However, because the HVOF process is a low temperature process compared to other methods used to apply layers and coatings, it has been found necessary to roughen the surface of the substrate to which MCrAlY is applied in order to achieve an effective bond between the applied alloy and the substrate. The roughening causes a mechanical bond to be formed between the superalloy substrate and the MCrAlY along with a weak metallurgical bond. This weak metallurgical bond is fully developed and strengthened in a subsequent diffusion heat treatment. The mechanics of formation and development of the metallurgical bond between MCrAlY bond coats and superalloy substrates is complex and the subject of much study. However, it does appear that the MCrAlY alloys applied by the low temperature HVOF process may not initially achieve the same effective metallurgical bond as overlays of metals applied by other, higher temperature processes. Thus, the mechanical bond between the MCrAlY layer and the substrate is very important to assure adhesion of the layer during subsequent processing of the parts and in service.

Although the surface roughness of the substrate can be achieved by a variety of methods, the most commonly used method to roughen the substrate surface is by grit blasting. While other methods may be used to achieve the necessary surface finish of roughness greater than at least about 80 RMS, such as machining or even casting a rough surface into the substrate article, these methods currently are not preferred. Grit blasting provides an inexpensive yet effective method of achieving a uniform surface roughness. It is desirable to roughen the substrates after it has been decided to utilize HVOF processes, which may occur well after fabrication of the substrate article.

As noted, grit blasting is utilized to achieve surface finishes having roughnesses greater than about 80 RMS and preferably in the range of 150–250 RMS. However, failures of high pressure turbine shrouds have been observed in substrates layered with metal applied by the HVOF process during engine testing. These failures were observed at the interface between the applied layer and the substrate, and occurred at about half the life expectancy of the engine. The failures were in the form of delaminations of the applied layers at the interface between the layers and the substrate. The timing of the failure was observed well after the metallurgical bond between the layer and the substrate should have fully developed. However, all of the delaminated shrouds were examined and found to have a high concentration of oxides at the interface. The presence of these oxides was attributed to contamination from grit used during the substrate roughening operation. The grit used in the blasting operation apparently becomes imbedded in the surface of the substrate, forming part of the interface during subsequent HVOF layering operations. The presence of the oxides had an adverse effect on the bonding of the applied layer to the substrate.

As a result of these observed failures, a processing method for assuring that components have an improved bond at the interface between the applied layer and the substrate are placed into service was developed. These turbine shrouds have roughened substrates with metallic layers applied by the HVOF process and have interface cleanliness meeting predetermined values. The substrates, comprising a lot of parts, were grit blasted to achieve the desired surface roughness. A control sample was grit blasted with the substrates. As used herein, the term control sample is used to refer to either a substrate of a similar composition as the lot of parts being processed or a representative production part that may be selected from the lot of processed parts. The roughened lot and control sample were then treated to remove the grit. Ideally, the process parameters of the grit blasting operation can be controlled to prevent embedding of the grit in the surface while still achieving the desired surface finish. However, once embedded, the grit must be removed. Although any method to insure removal of embedded grit may used, a high velocity fluid spray has been found to be very effective in removing embedded grit. For example, a stream of gas of sufficient pressure can be effective in removing grit from the surface. In this case, the control sample was water sprayed along with the remaining parts in the lot. Any water spray that develops a jet having a pressure sufficient to remove grit from the substrate surface will be effective. Other acceptable methods that may be used include acid etching the surface of the substrate a sufficient amount to remove the grit form the surface.

After cleaning with pressurized water and drying, the substrates along with the control sample were coated with NiCoCrAlY using the HVOF process. Any suitable MCrAlY composition may be used, and the composition may be adjusted in accordance with the operating conditions that will be encountered. For turbine shrouds, MCrAlY's falling in the following compositional range have been found to be acceptable in most engine applications, the compositional range be provided in weight percentage: about 31–33% Ni, about 20–22% Cr, about 7–9% Al, about 0.35–0.65% Y, up to about 0.15% Fe, up to about 0.02% C, up to about 0.01% S, up to about 0.01% P, up to about 0.05% O, up to about 0.01% N, up to about 0.005% Se and the balance Co and incidental impurities, the incidental impurities being present in quantities so as not to affect the nature of the alloy, but not to exceed about 0.4% total with no element of the impurities present in an amount greater than 0.1%. After coating, the coated substrates and the coated control samples were heat treated in a vacuum for about four hours at temperatures between about 2000–2100° F. to develop the metallurgical bond between the applied layer and the substrate. However, the metallurgical bond has been developed successfully at lower temperatures, as low as 1950° F. for times as short as two hours for other shroud lots of the same composition and design. Thus, the times and temperatures are limited by the effectiveness of the heat treatment in developing the metallurgical bona between the substrate and thermally applied layer.

The control sample was cross-sectioned and analyzed for cleanliness. It has been found that cleanliness limits must be maintained within 25%, that is, the interface oxide and porosity limit must be no greater than 25%. The interface oxide/porosity is determined by measuring and summing the projected linear length of the interface oxides and voids on a continuous 0.2–0.25 inch long cross section of the control sample. While the area measured is subjective, it included what was judged to the worst field of view of the cross section. The cross section may be viewed as photomicrographs or under an optical microscope with a Vernier measuring device. Measurements were made at 200× magnification, but may be made at any magnification greater than 100×magnification, and preferably in the range of 200×–250×magnification. Individual particles less than about 0.03 inches long at 200×magnification were not measured. Small grouped particles separated by less than 1 particle diameter were measured as a group length. The interface oxide percentage was calculated as the sum of the individual measured areas divided by the length evaluated. It may also be evaluated as an average of the result from each of a plurality of views.

Using the cleanliness measuring technique set forth above, lots of processed parts having an oxide percentage greater than 25% have a life expectancy that is less than the life expectancy of lots of processed parts having an oxide percentage less than 25%. Lots of parts having an oxide percentage of 25% or less as determined by the procedure set forth above, are expected to have a life expectancy approaching that of the engine hot section. However, parts having an oxide percentage greater than about 25% are predicted to fail by delamination at the interface before the life expectancy of the hot section of the engine hot section is achieved. For example, an oxide percentage in the range of about 35% resulted in delamination failures at about one half the life expectancy. Higher oxide percentages will result in failures at correspondingly earlier times within the life expectancy of the shrouds. Of course, the exact life expectancy of the hot section of an engine will vary depending on engine operating conditions, but the methodology of the present invention will result in a decrease or elimination of failures of shrouds due to coating delamination. Since one of the design goals of turbine engine operation is to improve engine efficiency by increasing operating temperatures, it may be necessary to lower these predetermined limits for acceptable percentage of oxides at the interface between the applied layer and the substrate as engine operating conditions become more demanding.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. An article comprised of:

a superalloy substrate having a surface roughness of at least 80 RMS;

a metallic layer overlying surface of the substrate applied by an HVOF process;

an interface between the substrate surface and the overlying metallic layer having a cleanliness of less than 25% oxide contamination to prevent delamination of the metallic layer from the substrate at sustained temperatures of operation of the article above about 1800° F. and at stresses above a critical value.

2. Turbine shrouds for use in a gas turbine engine made by a process comprising the steps of:

providing a plurality of superalloy shroud substrates as a lot of production shrouds;

roughening a preselected shroud surface of each of the superalloy shrouds to achieve a surface finish of 80 RMS and rougher by grit blasting;

controlling the grit embedded in the roughened surfaces of the superalloy shrouds;

spraying an MCrAlY powder using the HVOF process to form a layer over the preselected roughened surfaces of each shroud, in which M is an element selected from the group consisting of iron, cobalt, nickel and combinations thereof; then heat treating the layered shrouds in a protective atmosphere at a temperature and for a time sufficient to develop a metallurgical bond between the layers and the substrates; then selecting a representative shroud from the lot as a control sample;

sectioning the control sample;

evaluating the sectioned control sample at an interface between the applied layer and the roughened substrate by measuring the amount of oxide and porosity on a continuous length of the interface of at least 0.2 inches in length;

calculating the interface oxide percentage of the control sample as a sum of the measurements divided by the continuous length measured;

determining whether the calculated oxide percentage of the control sample is within predetermined acceptance levels of about 25% and less; and dispositioning the lot of layered production shrouds based on the calculated oxide percentage levels determined within the control sample.

3. A turbine shroud assembly, comprising:

a superalloy substrate having a surface finish of at least 80 RMS, the substrate including a surface having an oxide contamination of less than about 25%;

a metallic layer overlying a surface of the superalloy substrate, the layer deposited by melting a metallic powder in a flame at flame temperatures sufficient to melt the powder without melting the substrate, and directing the melted powder toward the substrate at high particle velocities so that the metallic layer adheres mechanically and metallurgically to the superalloy substrate;

the superalloy substrate surface with an oxide contamination of less than about 25% preventing delamination of the metallic layer from the surface at sustained temperatures of operation of the turbine shroud.

4. The shroud assembly of claim 3 wherein the superalloy substrate is Rene N5.

5. The shroud assembly of claim 3 wherein the superalloy substrate is MAR-M-509.

6. The shroud assembly of claim 3 wherein the metallic layer overlying the surface of the superalloy substrate is a MCrAlY.

7. The shroud assembly of claim 6 wherein the MCrAlY layer overlying the surface of the substrate further includes an element M, where M is selected from the group consisting of iron, cobalt, nickel and combinations thereof.

8. The shroud assembly of claim 6 wherein the MCrAlY layer overlying the surface of the substrate is applied to a thickness of at least about 0.03 inches.

9. The shroud assembly of claim 3 wherein the metallic layer overlying the surface of the superalloy substrate is a aluminide.

10. The shroud assembly of claim 3 wherein a superalloy substrate surface having the surface finish of at least 80 RMS is further characterized by being substantially free of contamination.

* * * * *